Jan. 2, 1951 E. A. CUNNINGHAM, JR 2,536,874
POWER FAILURE RESPONSIVE LOCKING
DEVICE FOR POWER OPERATORS
Filed May 20, 1947
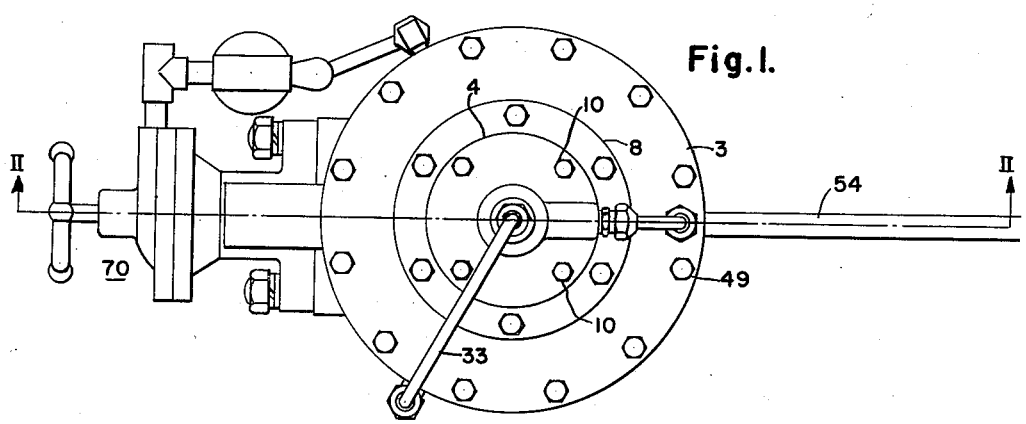
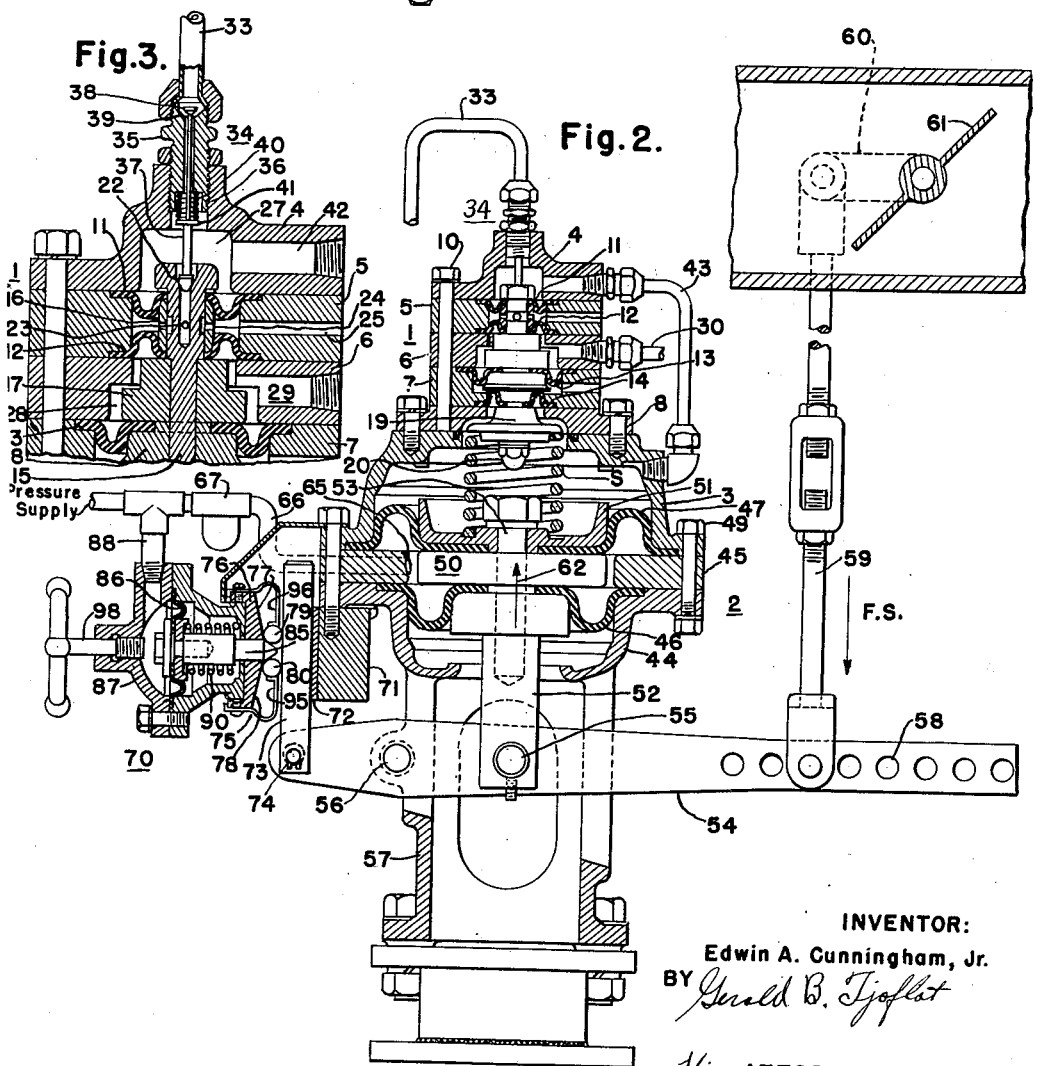
INVENTOR:
Edwin A. Cunningham, Jr.
BY Gerald B. Tjoflat
His ATTORNEY Patented Jan. 2, 1951

2,536,874

UNITED STATES PATENT OFFICE 2,536,874

POWER FAILURE RESPONSIVE LOCKING DEVICE FOR POWER OPERATORS

Edwin A. Cunningham, Jr., Baldwin Manor, Pa., assignor, by mesne assignments, to Hagan Corporation, Pittsburgh, Pa., a corporation of Pennsylvania Application May 20, 1947, Serial No. 749,255

2 Claims. (Cl. 121—40)

1

This invention relates to power operators employed for operating dampers, valves and the like in which the force developed and utilized for actuating the valves, dampers and the like results from pressures acting on power diaphragms rather than on the pistons of a power cylinder, and more particularly to devices for locking the power operator in any position when the source of supply of pressure for the power diaphragms fails or decreases below a predetermined value.

An object of this invention is to provide a diaphragm type of power operator having an automatically acting lock or brake which will be operative to lock the power operator in any position of its stroke when the primary operating pressure fails or decreases to or below a predetermined minimum value.

Another object of the invention is to provide a power operator of the diaphragm type which is extremely sensitive in its operation and which is provided with a simple and efficient locking or braking device which becomes operative automatically upon failure of the primary pressure to lock the power operator and prevent the load from moving the power diaphragms.

Other objects of the invention will, in part, be apparent, and will, in part, be obvious from the following description taken in conjunction with the accompanying drawings in which:

Figure 1 is a top plan view of a power operator arranged and constructed in accordance with an embodiment of the invention;

Fig. 2 is a view in section of a power operator taken on line II—II of Fig. 1, Fig. 2 also showing the regulator connected to operate a valve or damper in a pipe line; and Fig. 3 is an enlarged sectional view of a part of the operator shown in Figs. 1 and 2, said section being taken on a line corresponding to line II—II of Fig. 1.

Throughout the drawings and the specification, like reference characters indicate like parts.

The power operator comprises a control unit 1 and a power unit 2 disposed line in line or in tandem, but spaced from each other by means of a housing 3 to which units 1 and 2 are rigidly connected. Unit 1 comprises a cap or bonnet 4, spacing rings 5, 6 and 7, and a base plate 8, all of which are rigidly connected together by means of clamping bolts 10. Unit 1 includes a plurality of diaphragms 11, 12, 13 and 14, which are mounted in spaced relation on an assembly bolt 15 that extends through the central portions of these diaphragms and spacing and clamping

2 members 16, 17, 18 and 19, respectively. The central portions of the diaphragms in this assembly are clamped firmly by means of a nut 20 which is threaded onto the lower end of bolt 15.

The marginal edge of diaphragm 11 is clamped between bonnet or cap 4 and ring 5. The marginal edge of diaphragm 12 is clamped between ring 5 and ring 6. The marginal edge of diaphragm 13 is clamped between ring 6 and ring 7, and the marginal edge of diaphragm 14 is clamped between ring 7 and the base plate 8.

The head of bolt 15 is formed with a valve seat 22 that connects with the atmosphere by means of a drilled passage 23 formed in the shank of the bolt extending from the seat, a plurality of openings 24 in spacer 16 and a passageway 25 formed in ring 5.

As may be seen in both Figs. 2 and 3, a chamber 27 is formed by diaphragm 11 and the cap or bonnet 4, and a chamber 28 is formed by ring 6 and diaphragms 12 and 13. Ring 6 is provided with a tapped opening 29 to which a pipe line 30 may be connected for delivering a control fluid pressure such as compressed air to chamber 28.

As shown in the drawings, the effective areas of diaphragms 11, 12 and 14 are equal and the effective area of diaphragm 13 is greater than that of diaphragm 12.

Pressure is delivered to chamber 27 from a supply pipe 33 connected to a source of supply of fluid pressure, such as compressed air (not shown), of constant pressure through a valve 34. Valve 34 comprises a body 35 which is threaded into an opening 36 in bonnet 4 and a valve stem 37 disposed within the valve body. The upper end of the valve stem carries a valve element 38 disposed to seat on the inlet port 39 or to be lifted off the seat to the position shown in Fig. 3 when bolt 15 moves upwardly in response to a change in pressure conditions in the operator as will be more fully explained.

The lower end of the valve stem seats in the valve seat 22 when the diaphragm unit 1 is in neutral position. If desired, a compression spring 40 may be mounted coaxially of stem 37 and between the lower end of valve body 35 and a flange or collar 41 secured to the valve stem, in order to urge the valve stem towards the position in which the inlet port is closed. Pressure from chamber 27 is delivered through an outlet port 42 in cap 4 and a pipe 43 to the interior of housing 3.

Unit 2 comprises a housing 44, a spacing ring 45 and preformed diaphragms 46 and 47. The marginal edge of diaphragm 46 is disposed between housing 44 and ring 45, and the marginal edge of diaphragm 47 is disposed between housing 3 and ring 45. The edges of these diaphragms are clamped firmly in position by means of clamping bolts 49 to effect pressure tight joints.

The middle portions of diaphragms 46 and 47 are maintained in spaced relation to each other by a spacing ring 50, but are clamped rigidly to the spacing ring 50 by means of a cupped bearing plate 51 and a thrust member or post 52, by means of a bolt 53 that extends through the center of the bearing plate 51, the diaphragms, the spacing ring 50 and into the post 52.

Post 52 transmits the operating force of the power unit on the diaphragms. The travel of the post may be multiplied by connecting it to a lever 54 which is pin connected at 55 to the lever. The lever is pivoted on a pin 56 carried by an extension 57 of housing 44. Lever 54 may be connected to a valve damper or to be actuated by the power unit. This lever may be relatively long and provided with a series of clevis pin holes 58 whereby the effective stroke of the lever may be regulated with relation to the object to be moved thereby. Lever 54 is shown connected by a connecting rod 59 to the crank arm 60 of damper 61.

The space between diaphragms 46 and 47 forms a pressure chamber to which fluid pressure such as compressed air is supplied and maintained at a predetermined constant value. As may be seen in Fig. 2, the effective area of diaphragm 46 is smaller than the effective area of diaphragm 47, so that the net force developed by the pressure in this chamber will be equal to the applied pressure multiplied by the difference between the effective areas of diaphragms 47 and 46, respectively. This net operating force will always be constant and always acting in the same direction, viz., in the direction of arrow 62.

The pressure may be supplied to the chamber between diaphragms 47 and 46 through a port 65 formed in ring 45 to which a supply pipe 66 is connected. Supply pipe 66 is supplied with operating pressure from a pressure regulating device 67 that functions to maintain the pressure in the chamber between diaphragms 46 and 47 constant at some predetermined value. The pressure supply source connected to regulator 67 and pipe 66 may for purposes of description be regarded as a primary source of supply. If this source of supply pressure should fail or the pressure should fall to or below a predetermined value, the power developed by the diaphragm operator and necessary for actuating a valve or damper might be insufficient. It is therefore desirable that the regulator or damper should be locked in a given position at the moment of failure of the primary pressure supply. In order to lock the regulator in any position in which it may be at the time of failure, a locking device 70 is provided. This locking device comprises a brake or lock plate 71 secured to the diaphragm housing 44 and provided with a friction element or member 72 on one face thereof. The device includes also a link 73, one end of which is pin connected at 74 to lever 54 and a brake or lock applying mechanism 75. The brake or lock applying mechanism comprises a member 76 having oppositely inclined surfaces 77 and 78 and locking balls or rollers 79 and 80. The inclined surfaces 77 and 78 taper or converge towards the brake or lock pin 73.

If balls or rollers 79 and 80 were unrestrained, one or the other of them would wedge between the lock element 73, and one or the other of its tapered surfaces 77 and 78, causing the brake link 73 to be squeezed firmly against the friction member 72, thereby preventing movement of lever 54 of the operator. So long as the power supply to diaphragms 46 and 47 is normal or above a predetermined minimum value or has not failed, the balls or rollers 79 and 78 should be kept apart or far enough away from the point of intersection of surfaces 77 and 78 to prevent locking of the lock element 73 as above described.

In order to keep the balls or rollers 79 and 80 separated under normal conditions, a wedge or spreader element 85 is provided which is actuated in one direction by means of a diaphragm 86 disposed in a housing 87 to which the pressure supply source is connected by a pipe 88. The diaphragm is urged in the opposite direction by means of a compression spring 90.

So long as the supply pressure is normal or at or above a predetermined minimum value, the diaphragm will exert a force of sufficient magnitude to compress the spring and hold the wedge pin between the locking rollers or balls 79 and 80, but if the pressure fails or falls below the minimum value, the spring will cause the diaphragm to deflect, carrying the pin with it until it has been pulled away from between the balls or rollers 79 and 80. When this occurs and if the brake pin 73 is moving upwardly, roller or ball 80 will be wedged between the inclined surface 78 and the brake pin 73 so that the brake pin will be gripped and locked between the ball and the friction element 72. If the brake pin 73 is moving in the opposite direction, that is, downwardly as seen in Fig. 2, ball 79 will be wedged between the surface 77 and the brake pin 73 causing the latter to be pressed against the friction surface 72 and locking the power unit.

As shown in Fig. 2, balls or rollers 79 and 80 may be urged towards braking position by means of preformed leaf springs 95 and 96.

In order that the brake may be rendered inoperative or released whenever that is desired, housing 87 is provided with a hand wheel and a spindle 98 which is threaded into the housing and so positioned that when the hand wheel is turned to advance the spindle towards and into engagement with pin 85, continued advance of the spindle will move the pin 85 to the position in which the locking rollers or balls 79 and 80 are held apart.

The operation of the power unit above described will be apparent from the following. Since the pressures acting on diaphragms 11 and 14 are equal, and since the effective areas of these diaphragms are equal, the forces exerted by this pressure on these diaphragms will be equal and opposite. It will also be observed that since the effective area of diaphragm 13 is greater than that of diaphragm 12, the net force developed by the pressure delivered to the space between them will be equal to that pressure multiplied by the difference between the effective areas of diaphragms 13 and 12.

Also as stated previously, the net force developed by the pressure delivered to the chamber between diaphragms 46 and 47 will be equal to that pressure multiplied by the difference between the effective areas of diaphragms 47 and 46. Also, it will be observed that the force developed by the pressure in housing 3 on diaphragm 47 will be equal to the value of that pressure multiplied by the effective area of diaphragm 47.

If it be assumed that the pressure in pipe 30 is zero gauge, the pressure in the space between diaphragms 12 and 13 will be zero gauge. Under these conditions, compression spring S will cause the diaphragm assembly of unit 1 to move upwardly lifting the valve 38 off its inlet and allowing pressure to enter the chamber 27 and housing 3 through pipe 43. The pressure in chamber 27 and in housing 3 will build up until the regulator has moved its full stroke in the direction of arrow F—S, unless in the meantime the pressure delivered to the space between diaphragms 12 and 13 is reduced. If the latter has not occurred, the tension in spring S will be relieved sufficiently to cause the valve stem 37 to move and reseat valve 38 on the inlet seat 39.

If the pressure delivered to the space between diaphragms 12 and 13 is increased to some value intermediate zero gauge and the full maximum pressure, the net force of the pressure acting on diaphragms 12 and 13 will cause the diaphragms of the diaphragm unit 1 to move downwardly whereby the exhaust port seat 22 is uncovered and pressure is allowed to escape from chamber 27 and the chamber in housing 3 to the atmosphere. This will reduce the force of the pressure in housing 3 acting on diaphragm 47 with the result that the force exerted by the pressure in the space between diaphragms 46 and 47 will be preponderant and cause these diaphragms to move in the direction of arrow 62 and build up compression in spring S until the force of compression of this spring balances the net force acting on diaphragms 12 and 13, at which time the valve stem will seat on the exhaust port 22, the inlet port remaining closed.

Under normal operating conditions, the diaphragm operator will operate as above described so long as the source of fluid pressure supply is normal, but if for any reason the primary air supply should fail, then the brake device 70 will function to lock the power operator at any point of its stroke at the time of failure.

From the foregoing description, it will be apparent to those skilled in this art that various modifications and changes may be made without departing from the principle of the invention, or the scope or spirit thereof. Therefore, what I claim as new and desire to secure by Letters Patent is:

1. In combination, a pair of diaphragms mounted in spaced relation, means for clamping the marginal edges of said diaphragms to form a pressure chamber between them, one of said diaphragms having a larger effective area than the other, means for supplying a pressure fluid of substantially constant pressure to the space between said diaphragms, a pressure tight housing associated with the diaphragm having the larger effective area, means for supplying an adjustable control pressure to said housing for causing said pair of diaphragms to deflect in response to the difference between the constant pressure acting on said diaphragms in the space therebetween and the pressure in said housing acting on the diaphragm having the larger effective area, and motion transmitting mechanism connected to said pair of diaphragms, of a locking mechanism comprising a stationary backing member, a movable member secured to the clamping means for said diaphragms connected to said motion transmitting mechanism, wedging means associated with said movable member, and means responsive to the pressure supply for said pair of diaphragms for causing said wedging means to be held in unlocking relation to said movable member when the pressure of the supply source is normal and for releasing the same into locking engagement with said backing member when the pressure of the pressure supply decreases to a predetermined minimum value below normal.

2. A combination according to claim 1 characterized by the fact that the locking mechanism comprises a stationary friction member carried by the clamping means for said pair of diaphragms, a brake link movable along said friction member and being operatively connected to the motion transmitting mechanism, a wedge member having oppositely sloping surfaces converging towards said brake link, a locking roller disposed between each of said sloping surfaces and said brake link, a plunger, a diaphragm for actuating said plunger to a position in which said rollers are held out of gripping position with said surfaces and said link, a spring opposing said diaphragm and urging said plunger out of engagement with said rollers, and means for connecting the supply pressure to said diaphragm whereby the plunger is held between said rollers so long as the pressure of said supply source is above a predetermined value, said spring urging said plunger out of engagement with said rollers when the pressure decreases to a value below said predetermined value.

EDWIN A. CUNNINGHAM, Jr.

REFERENCES CITED

The following references are of record in the file of this patent:

UNITED STATES PATENTS

| Number | Name | Date |
|---|---|---|
| 1,962,459 | Ostlund | June 12, 1934 |
| 2,339,469 | Emanuel | Jan. 18, 1944 |
| 2,432,705 | Williams | Dec. 16, 1947 |

FOREIGN PATENTS

| Number | Country | Date |
|---|---|---|
| 443,871 | Great Britain | Mar. 5, 1936 |